United States Patent [19]

Kvaternik

[11] Patent Number: 4,791,693

[45] Date of Patent: Dec. 20, 1988

[54] CORN SILKING APPARATUS

[76] Inventor: Billy J. Kvaternik, Rte. 6, Box 255½, West Monroe, La. 71291

[21] Appl. No.: 923,437

[22] Filed: Oct. 27, 1986

[51] Int. Cl.[4] .................... A23N 12/00; A46B 13/02
[52] U.S. Cl. ...................... 15/3.17; 15/21 D; 15/39; 15/56; 15/70; 15/74; 15/75
[58] Field of Search ............. 15/3.1, 3.16, 3.17, 15/3.13, 21 D, 34, 39, 56, 65, 70, 71, 74, 75, 76, 101

[56] References Cited

U.S. PATENT DOCUMENTS

| | | | |
|---|---|---|---|
| 1,320,983 | 11/1919 | Brenckle | 15/21 D |
| 1,907,152 | 5/1933 | Fielding | 15/74 |
| 2,274,309 | 2/1942 | Velton | 15/56 |
| 2,666,937 | 1/1954 | Bennetts | 15/74 |
| 2,704,374 | 3/1955 | Barklow | 15/39 |
| 2,794,196 | 6/1957 | Koeppe | 15/75 |
| 2,973,534 | 3/1961 | Gilderbloom | 15/74 |

FOREIGN PATENT DOCUMENTS 599777  11/1959  Italy ....................... 15/75

Primary Examiner—Edward L. Roberts
Attorney, Agent, or Firm—John M. Harrison

[57] ABSTRACT

A corn silking apparatus designed to remove the silk from ears of corn, which is characterized by a housing containing a drive gear and a driven, or idler gear. The drive gear is driven by an electric motor and carries a drive shaft and the idler gear carries an idler shaft, which drive shaft and idler shaft are spaced from each other in parallel relationship and each receive a pair of brushes that rotate in different directions. The silk is removed from individual ears of corn by placing the ears on top of and between the rotating brushes. In a first preferred embodiment, the drive shaft and idler shaft extend through the housing and are journalled for rotation in bushings located in a removable front plate and a rear end plate and the motor is located externally of the housing. In a second preferred embodiment the housing is molded in one piece, the motor and gears are contained therein and bushings are molded in the front and rear panels of the housing, in order to support the rotating drive shaft and idler shaft.

4 Claims, 2 Drawing Sheets

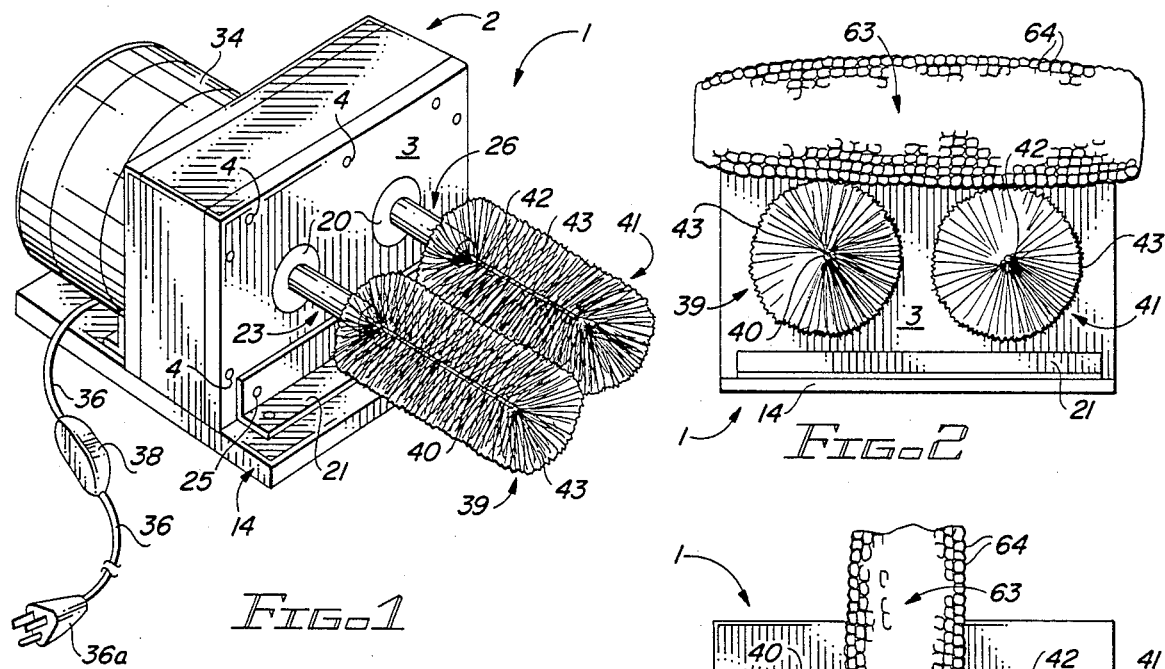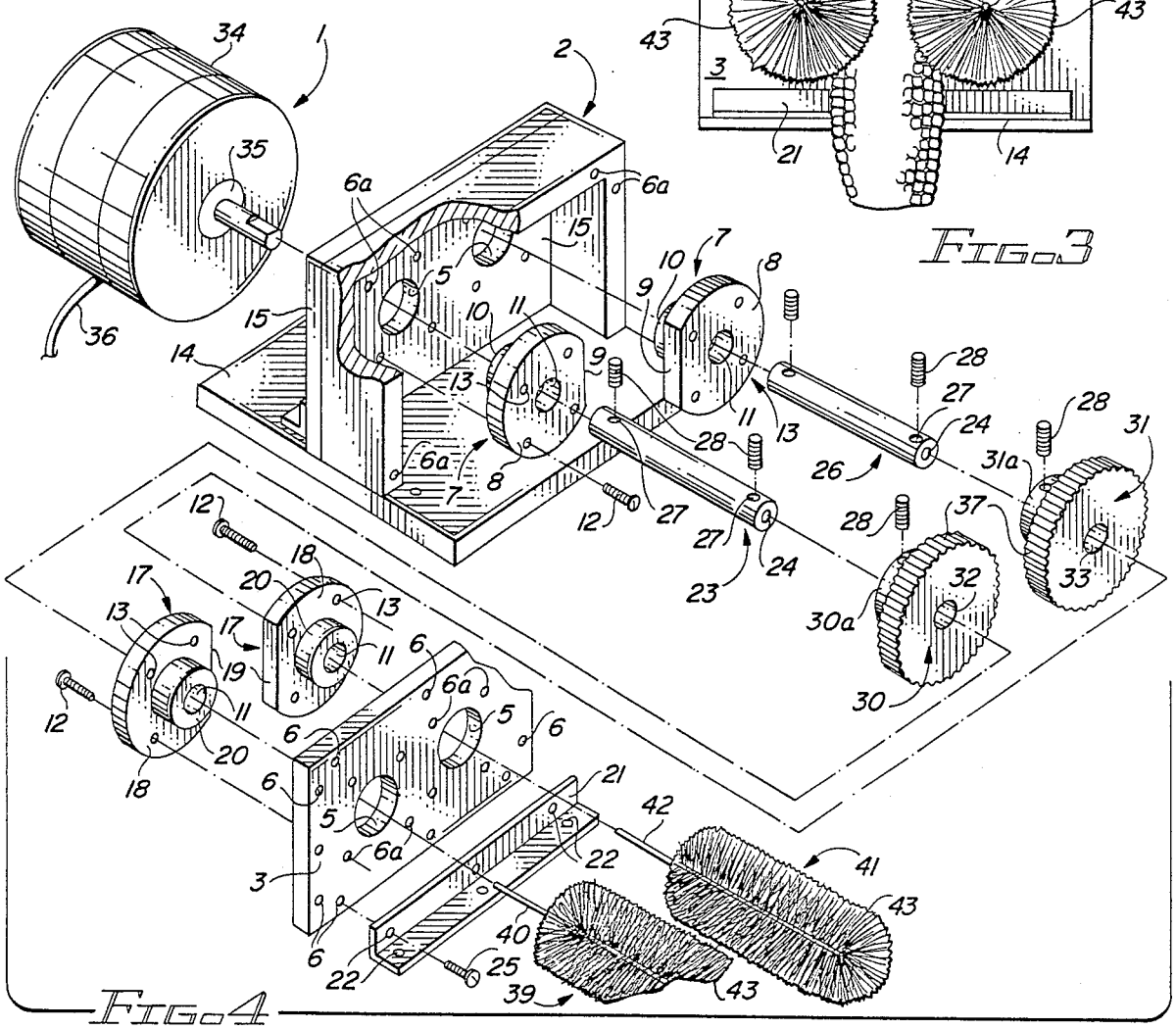

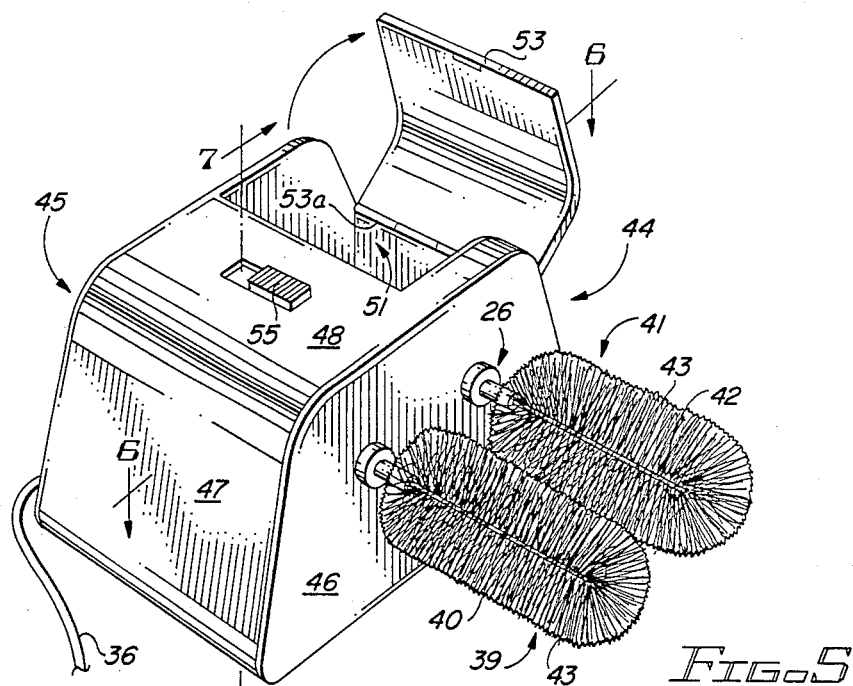
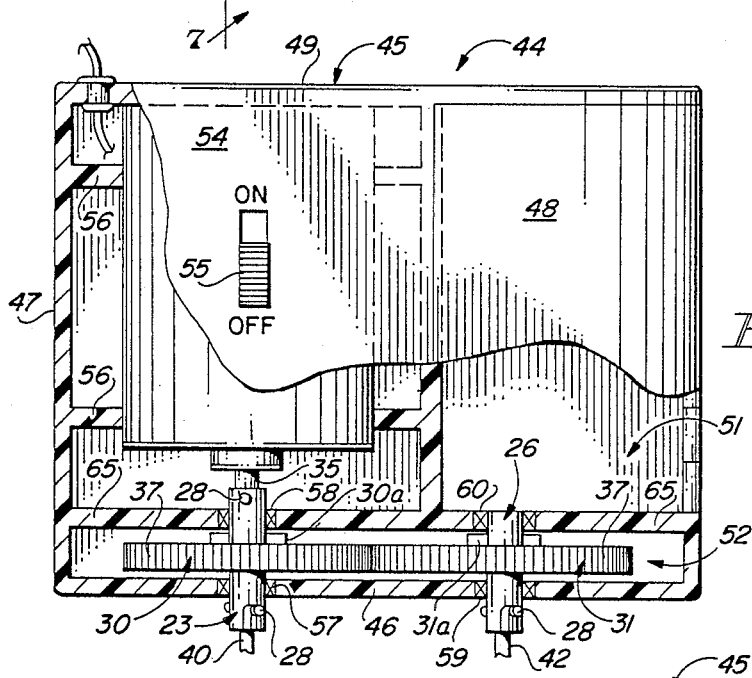
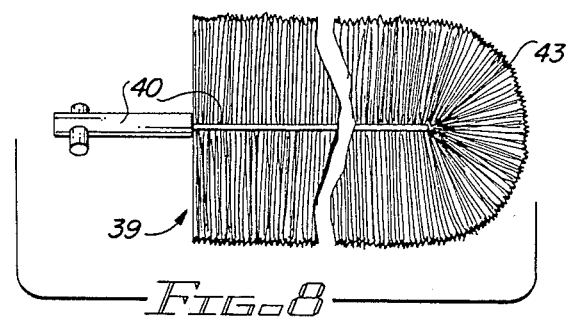
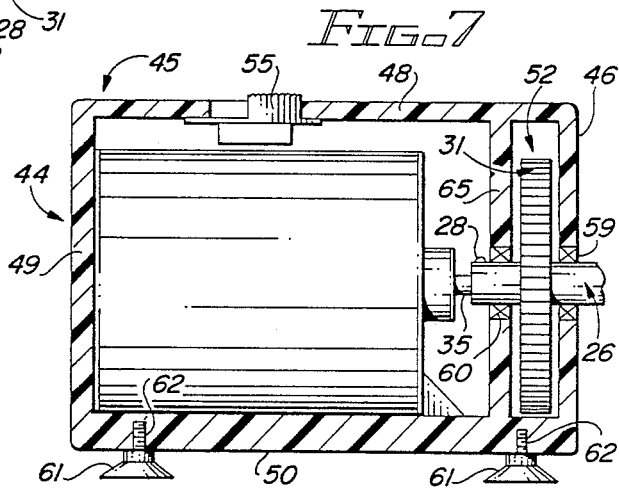

CORN SILKING APPARATUS

BACKGROUND OF THE INVENTION

1. Field of the Invention

This invention relates to corn processing equipment and more particularly, to a corn silking apparatus which is designed to remove corn silk from individual ears of corn. The corn silking apparatus of this invention is characterized by a housing which contains a drive gear and a cooperating drive shaft, a driven or idler gear engaging the drive gear and carrying an idler shaft and a pair of brushes mounted on the drive shaft and the idler shaft, respectively. The brushes are designed to rotate in different directions by operation of the drive gear and idler gear in order to remove the silk from an ear of corn which is placed transversely across the top of the brushes or positioned between the brushes. In a first preferred embodiment of the invention the housing is characterized by an open housing which includes a removable front plate, a rear plate and an external electric motor for driving the internally located drive and idler gears. In a second preferred embodiment the housing is molded of a thermoplastic or thermoresin material such as polyethylene or polypropylene and the motor, drive gear and idler gear are located inside the housing.

Corn silk is normally removed from corn by scrubbing or washing, or a combination thereof, by utilizing scrubbing systems of various description. For household use, corn silk is normally removed from the kernels of corn by hand, using a knife or other sharp instrument. Mechanical washing and scrubbing systems are relatively inefficient in removing corn silk, since the stringy by-product has a tendency to embed itself tightly between the kernels of the corn and is very difficult to dislodge.

It has surprisingly been found that a pair of rotating brushes which operate in different directions and are spaced sufficiently far apart to receive an ear of corn therebetween are operable to remove silk from corn in a very efficient and rapid manner.

2. Description of the Prior Art

Various types of vegetable and fruit scrubbers and cleaners are known in the art. U.S. Pat. No. 2,286,393, dated June 16, 1942, to J. Thomas, discloses a "Vegetable Cleaner", which uses a multiple brush system with a water spray to effect a thorough cleansing of vegetables without injuring the vegetables. U.S. Pat. No. 2,287,447, dated June 23, 1942, to R. Peeples, discloses a "Cleaning Means for Fruits, Vegetables, Etc.", which employs upper and lower groups of parallel spiral brushes, between which the fruit or vegetables pass along a path transversely of the longitudinal axis of the brushes. A driving mechanism is employed for driving the brushes and is organized and controlled such that certain of the brushes of the lower group which are all of the same diameter, are rotated at different speeds from those of other brushes of that group and at a different speed from the brushes of the upper group. Accordingly, the vegetables and fruit advance through te machine in steps, with intermittant movement so as to effect the turning and temporary retarding of the vegetables and fruit while the upper brushes are working thereon. A "Demountable Brushing Machine" is disclosed in U.S. Pat. No. 2,518,799, dated Aug. 15, 1950, to D. E. Leonard. The brushing machine of this invention is characterized by a light-weight, sturdy supporting framework formed of angle iron which supports the other parts of the machine. The machine is characterized by a water spray system with rotatable brushes for turning, tumbling and washing fruit or vegetables introduced into the machine. U.S. Pat. No. 3,114,162, dated Dec. 17, 1963, to T. Inoshita, discloses an "Onion Washing and Cleaning Machine". The machine includes a receiving belt and a pair of gripping belts provided in cooperation with the receiving belt, whereby onions are firmly held by the trunk or middle portion while they are conveyed through a washing and brushing apparatus in a manner such that all exposed surfaces are subjected to the washing and brushing action. The gripping belts are designed to tilt the onions from a horizontal position to a vertical position and move them through sprays and brush mechanisms and finally deliver the onions in uniform positions for placement in suitable containers. U.S. Pat. No. 3,199,134, dated Aug. 10, 1965, to J. A. Jones, discloses "brushes for cleaning citrus or other fruit produce prior to packaging thereof". The system incorporates a rotatable brush which includes an axial form carrying radially projecting bristles and shaped to define a circular, transverse cross-section of varying diameter along the length of the brush to shape smoothly formed, waisted portions at regular intervals. Alternatively, the brush can be manufactured with radially projecting bunches of bristles or with the bristles arranged along a helical path around the cylindrical support structure. Several brushes having this configuration are mounted in tandem in a frame and are designed to receive, rotate, brush and scrub fruit introduced therein.

It is an object of the invention is to provide a new and improved corn desilking apparatus which includes a pair of rotating brushes disposed in spaced relationship and designed to rotate in opposite directions for engaging ears of corn and removing the silk from the corn.

Another object of this invention to provide a new and improved apparatus for removing corn silk from ears of corn, which apparatus is characterized by a housing containing a drive gear and idler gear, with a drive shaft and idler shaft mounted in the drive gear and idler gear, respectively, and a pair of brushes secured to the drive shaft and idler shaft, the brushes being designed to rotate in the housing in opposite directions for removing the corn silk from the ears of corn.

Still another object of the invention is to provide a new and improved corn silk-removing apparatus which is characterized by an open housing having a removable front panel, with a drive gear and idler gear disposed in the housing in meshing relationship, a drive shaft carried by the drive gear and provided in driven association with an external electric motor and an idler shaft carried by the idler gear, the drive shaft and idler shaft being journalled for rotation in bushings provided in the removable front plate and in a corresponding rear plate, respectively. A pair of brushes are attached to the drive shaft and idler shaft and the brushes are caused to rotate in opposite directions responsive to operation of the electric motor, in order to contact ears of corn and remove silk from the corn.

A still further object of this invention is to provide a new and improved corn silking apparatus which includes a shaped housing containing a motor, a drive gear and an idler gear meshing with the drive gear; a drive shaft carried by the drive gear and an idler shaft carried by the idler gear, the drive shaft and idler shaft being journalled for rotation in the housing; and a pair of brushes attached to the drive shaft and the idler shaft in spaced relationship, respectively, where-in the brushes are caused to rotate in opposite directions by the motor and are designed to contact an ear of corn and remove silk from the corn responsive to the counter-rotation of the brushes.

SUMMARY OF THE INVENTION

These and other objects of the invention are provided in a new and improved apparatus for removing corn silk from ears of corn, which apparatus is characterized by a pair of spaced, rotating brushes that operate in opposite directions to receive an ear of corn and remove the silk from the corn. In a first preferred embodiment, the brushes are attached to a drive shaft and an idler shaft, respectively, which extend through bushings located in a removable front plate or panel and a corresponding fixed rear panel provided in a housing. The drive shaft and idler shaft are carried by a drive gear and an idler gear, respectively, provided in the housing in meshing relationship, which drive gear is attached to an electric motor located externally of the housing. In a second preferred embodiment, the rotating brushes are attached to one end of a drive shaft and idler shaft which are journalled for rotation in a shaped housing containing an electric motor, with the drive shaft carried by a drive gear and the opposite end thereof extending into driving connection with the electric motor and the idler shaft carrying an idler gear which engages the drive gear, whereby the brushes are rotated in opposite directions responsive to operation of the electric motor.

BRIEF DESCRIPTION OF THE DRAWING

The invention will be better understood by reference to the accompanying drawings, wherein:

FIG. 1 is a perspective view of an open housing corn silking apparatus according to this invention;

FIG. 2 is a front elevation of the open housing corn silking apparatus illustrated in FIG. 1, illustrating a first preferred configuration for desilking an ear of corn;

FIG. 3 is a front elevation of the open housing corn silking apparatus, illustrating a second preferred configuration for desilking an ear of corn;

FIG. 4 is an exploded view of a preferred embodiment of the corn silking apparatus illustrated in FIG. 1;

FIG. 5 is a perspective view of a molded housing corn silking apparatus according to a second preferred embodiment of this invention;

FIG. 6 is a top view, partially in section, of the molded housing corn silking apparatus illustrated in FIG. 5; FIG. 7 is a sectional view taken along line 7—7 of the molded housing corn silking apparatus illustrated in FIG. 5; and FIG. 8 is a side view o a typical brush used in the open housing corn silking apparatus and the molded housing corn silking apparatus of this invention.

DESCRIPTION OF THE PREFERRED EMBODIMENTS

Referring initially to FIGS. 1 and 4 of the drawings, an open housing corn silking apparatus is generally illustrated by reference numeral 1. In a first preferred embodiment, the open housing the corn silking apparatus 1 is characterized by an open housing 2, which is mounted on a base 14 and is provided with a removable front end plate 3 and a rear end plate 15. A mount bracket 21, having mount bracket apertures 22, is secured to the base 14 and the open housing 2 by means of bracket mount bolts 25, in order to help secure the front end plate 3 to the open housing 2. The front end plate 3 is secured to the open housing 2 by means of plate bolts 4, which register with bolt apertures 6, provided in the front end plate 3 and with threaded receiving apertures 6a, provided in the sides and top panels of the open housing 2, as illustrated. Bushing openings 5 are provided in spaced, aligned relationship in both the front end plate 3 and the rear end plate 15. The bushing openings 5 provided in the rear end plate 15 accommodate rear bushing extensions 10, which project from the rear bushing flanges 8 of the rear bushings 7, as illustrated in FIG. 4. The rear bushings 7 are disposed in side-by-side relationship and engage each other at the truncated rear flange shoulders 9. The rear bushings 7 are secured to the rear end plate 15 by means of bushing bolt apertures 13, which are drilled in the rear bushing flanges 8 and by cooperating receiving bushing mount bolts 12, which threadably seat in the threaded receptacle apertures 6a, located in the rear end plate 15. Similarly, the front bushings 17 are each provided with a front bushing flange 18, which is truncated to define matching and facing front flange shoulders 19 and a front bushing extension 20, extending from the front bushing flange 18, as illustrated in FIG. 4. Each of the front bushings 17 is designed to bolt to the front end plate 3 b means of additional bushing mount bolts 12, which extend through bushing bolt apertures 13 provided in the front bushing flanges 18 and threadibly attach to additional threaded receiving apertures 6a, tapped in front end plate 33. When the front bushings 17 are so installed, the front bushing extensions 20 project through the spaced bushing openings 5 located in the front end plate 3, as illustrated in FIGS. 1 and 4. Drive shaft openings 11 are provided in one of the aligned sets of rear bushings 7 and front bushings 17 in order to rotatably accommodate a drive shaft 23, which extends through one aligned set of front bushings 17 and rear bushings 7. An idler shaft 26 projects through the companion aligned sets of front bushings 17 and rear bushings 7. One end of the drive shaft 23 is coupled to the motor shaft 35 of an external electric motor 34, which is fitted with electric wiring 36, a plug 36a and a cord switch 38, while the opposite end of the drive shaft 23 extends through the drive gear aperture 32 of a drive gear 30. The drive gear 30 is mounted on the drive shaft 23 by means of an allen screw 28, which is threadibly seated in the drive gear collar 30a of the drive gear 30. The brush end of the drive shaft 23 projects through the drive gear aperture 32 and extends through the drive shaft opening 11 in one of the front bushings 17, as illustrated in FIG. 1. One end of the idler shaft 26 projects through the drive shaft opening 11 provided in the opposite rear bushing 7, which is seated in the rear end plate 15. The opposite, or brush end of the idler shaft 26 projects through an idler gear aperture 33 provided in an idler gear 31. The idler gear 31 is secured to the idler shaft 26 by means of an allen screw 28, which is threadibly seated in an idler gear collar 31a, carried by the idler gear 31. The drive gear 30 and idler gear 31 mesh by means of cooperating gear teeth 37 when the open housing corn silking apparatus 1 is assembled as illustrated in FIG. 1. The idler shaft 26 projects through the idler gear aperture 33 and drive shaft opening 11 which corresponds to one of the front bushings 17 seated in the front end plate 3, as illustrated in FIG. 1.

Referring now to FIGS. 1, 4 and 8 of the drawings, the forwardly extending, or brush end of the drive shaft 23 is provided with a longitudinal drive shaft aperture 24, as illustrated in FIG. 4 and removably receives the drive brush shaft 40 of a drive brush 39. Similarly, the forwardly extending, or brush end of the idler shaft 26 is also provided with a drive shaft aperture 24 and receives the idler brush shaft 42 of an idler brush 41. Both the drive brush 39 and the idler brush 41 are characterized by resilient bristles 43, as illustrated in FIG. 8, and are located in spaced relationship with respect of each other when seated in the drive shaft 23 and idler shaft 26, as illustrated in FIG. 1. The spacial orientation of the drive brush 39 and idler brush 41 are further illustrated in FIGS. 2 and 3 of the drawings. In a most preferred embodiment of the invention, the motor end of the drive shaft 23 is provided with an internal aperture (not illustrated) for receiving the motor shaft 35 of the motor 34 and a pair of threaded allen screw apertures 27 are tapped in transverse relationship in each end of the drive shaft 23, in order to secure the drive shaft 23 on the motor shaft 35 and the drive brush shaft 40 in the drive shaft aperture 24 of the drive shaft 23, respectively. Furthermore, the brush- receiving end of the idler shaft 26 is also provided with a threaded allen screw aperture 27 for receiving an allen screw 28, in order to secure the idler brush 42 in the shaft aperture 24 and secure the idler brush 41 on the idler shaft 26.

Referring now to FIGS. 5-7 of the drawings in a second preferred embodiment of the invention, a molded housing corn silking apparatus 44 is characterized by a molded housing 45 having a front panel 46, side panels 47, a top panel 48, a rear panel 49 and a bottom panel 50, as illustrated. An optional storage and access compartment 51 is provided in one side of the molded housing 45 and as illustrated in FIGS. 6 and 7, a gear housing 52 is molded in the molded housing 45, in order to accommodate the drive gear 30 and idler gear 31 and to securely locate and support the drive shaft 23 and the idler shaft 26. In a most preferred embodiment of the invention the drive shaft 23 is seated in an outside drive shaft bushing 57, located in the front panel 46 and an inside drive shaft bushing 58, seated in the inner wall 65, which defines the inside partition of the gear housing 52. Similarly, the idler shaft 26 is seated in an outside idler shaft bushing 59, also provided in the front panel 46 and an inside idler shaft bushing 60, located in oppositely-disposed, aligned relationship in the inner wall 65. As in the case of the open housing corn silking apparatus illustrated in FIGS. 1-4, the drive shaft brush 40 of a drive brush 39 is seated in a shaft aperture 24 located in the forwardly projecting end of the drive shaft 23 and is secured therein by means of an allen screw 28. Furthermore, the idler brush shaft 42 of the idler brush 41 is secured in a corresponding shaft aperture 24 located in the forwardly projecting end of the idler shaft 26 by means of a second allen screw 28. In a most preferred embodiment of the invention the drive brush 39 is characterized by a drive brush shaft 40 and bristles 43, as illustrated in FIG. 8 and the idler brush 41 is similarly constructed. Further as in the case of the open housing corn silking apparatus 1 illustrated in FIGS. 1-4, the motor end of the drive shaft 23 is secured to the motor shaft 35 by means of another allen screw 28, as heretofore described and as illustrated in FIG. 7. An internal electric motor 54 is located inside the molded housing 45 and rests on a pair of motor mounts 56, which, in a most preferred embodiment of the invention, are molded integrally with the molded housing 45. A housing switch 55 is provided in the top panel 48 of the molded housing 45 and is wired to selectively energize the internal electric motor 54 when the electric wiring 36 is connected to a source of electric power. In yet another most preferred embodiment of the invention, four suction cups 61 are attached to the bottom panel 50 of the molded housing 45 by means of suction cup studs 62, as illustrated in FIG. 7, in order to removably secure the molded housing corn silking apparatus 44 to a flat surface.

Referring again to FIG. 5 of the drawings in still another most preferred embodiment of the invention the storage compartment 51 is closed by a door 53, which is mounted to the side panel 47 of the molded housing 45 by means of hinges 53a. The storage and access compartment 51 can be used for storing small articles such as spare brushes, bushings, gears and the like, which are necessary for maintaining the molded housing corn silking apparatus 44 in operating condition and t provide access to various component parts of the molded housing corn silking apparatus 44, as hereinafter described.

Referring again to the drawings, the open housing corn silking apparatus 1 and the molded housing corn silking apparatus 44 are operated as follows. The open housing corn silking apparatus 1 is initially energized by manipulating the cord switch 38 and the molded housing corn silking apparatus 44 is operated by pushing the housing switch 55. The drive brush 39 is then caused to rotate in the clockwise direction and the idler brush 41 in the counterclockwise direction by operation of the meshing drive gear 30 and idler gear 31, as illustrated by the arrows in FIGS. 2 and 3. An ear of corn 63 is then placed in horizontal orientation in contact with the bristles 43 of the drive brush 39 and the idler brush 41, as illustrated in FIG. 2. Due to the opposite directional rotation of the drive brush 39 and the idler brush 41, corn silk which is embedded between the kernels 64 of the ear of corn 63 are forced toward the middle of the ear of corn 63 by the bristles 43. As the ear of corn 63 is rotated on its longitudinal axis while held in contact with the rotating bristles 43, the corn silk is dislodged from the kernels 64 and is forced downwardly between the drive brush 39 and the idler brush 41. Removal of the corn silk can also be achieved by advancing the ear of corn 63 between the drive brush 39 and the idler brush 41 as illustrated in FIG. 3, while rotating the ear of corn 63 on its longitudinal axis, whereupon the opposite directional rotation of the drive brush 39 and the idler brush 41 successively removes the cornsilk from between the respective kernels 64 of the ear of corn 63.

Referring again to the open housing corn silking apparatus 1 illustrated in FIGS. 1-4 and the molded housing corn silking apparatus 44 illustrated in FIGS. 5-8, it will be appreciated by those skilled in the art that the devices are easily maintained and operated and serve as a convenient household appliance for removing corn silk from ears of corn. In another most preferred embodiment of the invention the bristles 43 of both the drive brush 39 and the idler brush 41 are constructed of nylon or hemp and are relatively soft, resilient and flexible, in order to effect removal of the corn silk without damaging the individual kernels 6 in each ear of corn 63. Furthermore, as illustrated in FIGS. 2 and 3, the spacing of the drive brush shaft 40 and idler brush shaft 42 and the drive brush 39 and idler brush 41, is such that an ear of corn 63 of average size is easily moved between the drive brush 39 and the idler brush 41, as illustrated in FIG. 3. However, if the ear of corn 63 is too large for this spacing, the corn silk can also be removed by orienting the ear of corn 63 against the drive brush 39 and idler brush 41 in a horizontal position, as illustrated in FIG. 2.

Referring again to FIGS. 6 and 7 of the drawings, in another most preferred embodiment of the invention the inner wall 65 of the molded housing 45 extends upwardly from attachment to the bottom panel 50 and terminates immediately above the inside idler shaft bushings 60, leaving a space between the inner wall 65 and the top panel 48, in order to facilitate maintenance on the internal component parts of the molded housing corn silking apparatus 44 by access through the storage compartment 51.

While the preferred embodiments of the invention have been described above, it will be recognized and understood that various other modifications may be made therein and the appended claims are intended to cover all such modifications which may fall within the spirit and scope of the invention.

Having described my invention with the particularity set forth above what is claimed is:

1. An apparatus for removing corn silk from an ear of corn comprising:
   (a) a molded housing having a front panel and a rear panel;
   (b) a drive shaft journalled for rotation in said front panel, with one end of said drive shaft projecting through said front panel;
   (c) an idler shaft journalled for rotation in said front panel in spaced, substantially parallel relationship with respect to said drive shaft, with one end of said idler shaft projecting through said front panel;
   (d) a drive gear carried by said drive shaft and an idler gear carried by said idler shaft, said idler gear provided in meshing relationship with said drive gear and both said drive gear and said idler gear located in said housing;
   (e) a drive brush mounted on said one end of said drive shaft and an idler brush mounted on said one end of said idler shaft, said drive brush and said idler brush positioned in spaced, substantially parallel relationship with respect to each other;
   (f) drive means located in said housing, said drive means coupled to said drive shaft, whereby said drive brush and said idler brush are caused to rotate in opposite directions responsive to operation of said drive means; and
   (g) a storage compartment provided in said molded housing behind said idler shaft and beside said drive means.

2. The apparatus of claim 1 further comprising an inner wall provided in said housing in spaced, substantially parallel relationship to said front panel and wherein said drive gear and said idler gear are located between said inner wall and said front panel.

3. The apparatus of claim 1 wherein said drive means is an electric motor located in said molded housing and further comprising a cover carried by said molded housing for closing said storage compartment.

4. The apparatus of claim 1 further comprising an inner wall provided in said housing in spaced, substantially parallel relationship to said front panel and wherein:
   (a) said drive gear and said idler gear are located between said inner wall and said front panel; and
   (b) said drive means is an electric motor located inside said molded housing.

* * * * *